United States Patent [19]

Akitake

[11] Patent Number: 5,016,993

[45] Date of Patent: May 21, 1991

[54] ZOOM MECHANISM FOR ZOOM LENSES

[75] Inventor: Hiroshi Akitake, Hachioji, Japan

[73] Assignee: Olympus Optical Company Ltd., Japan

[21] Appl. No.: 252,504

[22] Filed: Sep. 30, 1988

[30] Foreign Application Priority Data

Oct. 2, 1987 [JP] Japan .................. 62-250440
Oct. 6, 1987 [JP] Japan .................. 62-251848

[51] Int. Cl.⁵ .............................. G02B 15/00
[52] U.S. Cl. .................. 350/429; 354/195.13
[58] Field of Search ........... 350/429, 430; 354/400, 354/402, 403, 409, 195.12, 195.13, 199

[56] References Cited

U.S. PATENT DOCUMENTS

| | | | |
|---|---|---|---|
| 3,185,029 | 5/1965 | Peck et al. | 350/429 |
| 4,008,951 | 2/1977 | Himmelsbach | 350/429 |
| 4,043,642 | 8/1977 | Hirose et al. | 350/429 |
| 4,161,756 | 7/1979 | Thomas | 350/429 |
| 4,256,371 | 3/1981 | Someya | 350/429 |
| 4,275,952 | 6/1981 | Uesugi | 350/429 |
| 4,621,906 | 11/1986 | Hashimoto et al. | 350/429 |
| 4,676,600 | 6/1987 | Takizawa | 350/429 |

Primary Examiner—Paul M. Dzierzynski
Assistant Examiner—Loha Ben
Attorney, Agent, or Firm—Louis Weinstein

[57] ABSTRACT

A zoom mechanism for zoom lenses drives a focusing lens group in a linear manner and lens groups other than the focusing lens group in either a non-linear or a linear manner, during a zooming operation and, after the zooming operation, drives the focusing lens group for the focusing operation to correct a difference caused in the zooming operation.

30 Claims, 8 Drawing Sheets

ZOOM MECHANISM FOR ZOOM LENSES

BACKGROUND OF THE INVENTION

The present invention relates to a zoom mechanism for zoom lenses, and more particularly, to a zoom mechanism for zoom lenses which performs a zooming operation by moving a plurality of lens groups including a focusing lens group in their respective optical axis directions.

A lens shutter camera provided with a zoom lens generally comprises a zoom drive mechanism for driving each of the lens groups during the zooming operation and a focus drive mechanism for driving a focusing lens group during the focusing operation. In the prior art, however, in a mechanism for driving a focusing lens group, mechansims for zooming and focusing operations are provided in duplication. Accordingly, when an auto-focus apparatus is constructed with an electric motor driven zoom, its drive source (motor) doubles, resulting in an increase in size, number of parts and cost of a camera.

In addition, in a conventional zoom mechanism for zoom lenses, non-linear movement of a lens group is generally embodied by using a cam ring, cam member, non-circular gear or the like. In another case, a mechanism has been proposed in which after a zooming operation has been performed by moving a focusing lens group together with other lens groups in a unitary manner, a position of the focusing lens group is corrected during the focusing operation. With a cam ring, however, the cost and size of a camera increase. While a mechanism without a cam ring has also been proposed, such mechanism is complicated and the size of a camera cannot be made so small. In addition, while a proposal of reducing the number of cam members has been made, an amount of correction increases, resulting in a larger-sized camera body, complicated control and a reduced shutter release time.

SUMMARY OF THE INVENTION

It is an object of the present invention to provide a lens drive mechansim which is capable of eliminating the disadvantages described above in the prior art.

It is another object of the present invention to provide a lens drive mechanism for moving a focusing lens group for a zoom lens so as to result in a non-linear movement without employing a non-linear movement device such as a cam.

It is a further object of the present invention to provide a lens drive mechanism for moving a focusing lens group of a zoom lens in which a drive source is capable of being shared in focusing and zooming operations.

According to the present invention, it is possible to provide a zoom mechanism with a high accuracy and with a size and cost reduced without requiring a complicated control.

According to the present invention, a focusing lens group, which moves in a non-linear manner in the prior art, is made possible to move in a linear manner, so that the cost, size and release time lag can be reduced.

DETAILED DESCRIPTION OF PREFERRED EMBODIMENTS

Figure 1:
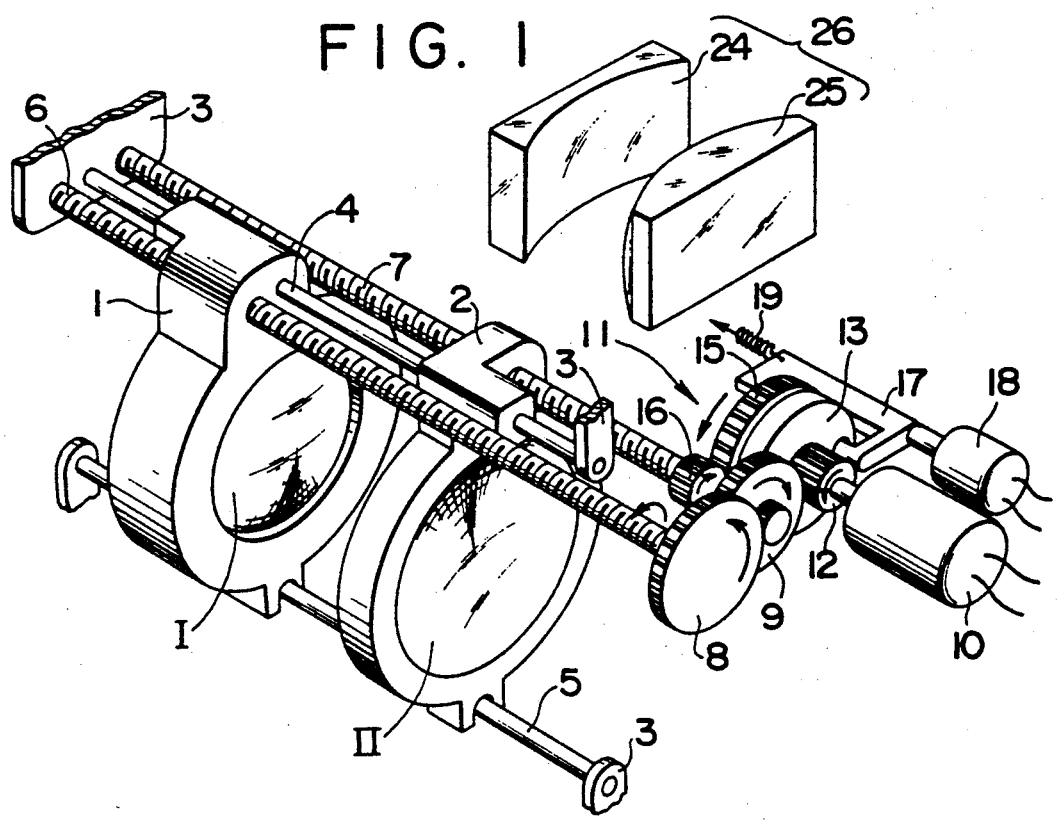
FIG. 1 is a perspective view of a zoom mechanism illustrating a first embodiment in which the present invention is applied to two zoom lens groups.

In FIG. 1, a front frame 1 holding a front lens group I of a focusing lens group and a rear frame 2 holding a rear lens group II are slidably supported by upper and lower support axes 4 and 5 which are fixed to a camera body 3 (the whole body is not shown) so as to be movable in a direction of the optical axis and to be prevented from turning. The front frame 1 threadably engages a front screw shaft 6 which is rotatably supported on the camera body 3 and in parallel with support shaft 4. The rear frame 2 threadably engages a rear screw shaft 7 which is rotatably supported by the camera frame 3 in parallel with the support shaft 4. The front and rear frames 1 and 2 are carried by rotation of the screw shafts 6 and 7 in the direction of the optical axis. A front gear 8 integral with the front screw shaft 6 is connected through a gear 9 to a sun gear 12 of a differential gear mechanism 11 which sun gear is fixed to a drive shaft of a motor 10.

Figure 4:
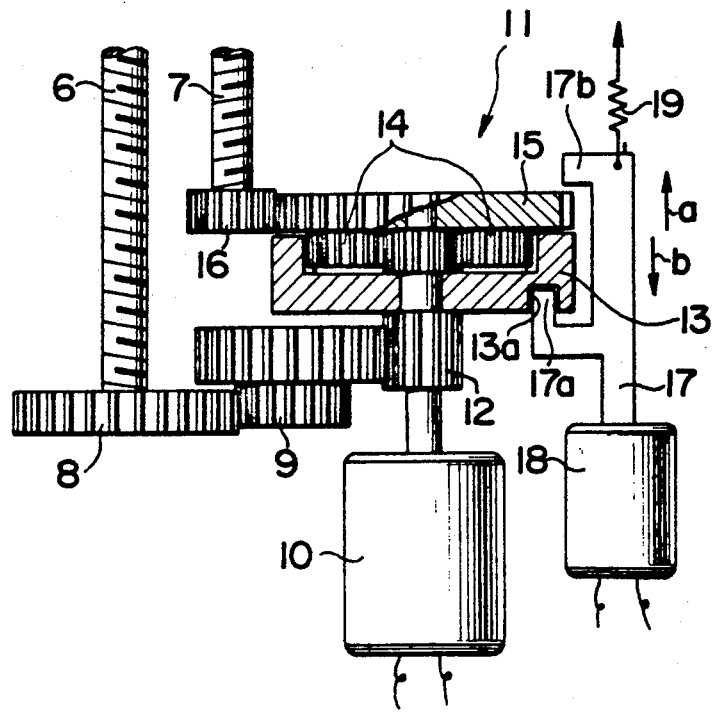
FIG. 4 is an enlarged sectional view of a differential gear mechanism and a change-over device as shown in FIGS. 1 and 2.

The differential gear mechanism 11, as shown in FIG. 4 in detail, comprises an inner tooth gear 13 rotatable to the sun gear 12, a plurality of planet gears 14 engaging the inner tooth gear 13 and the sun gear 12 and a carrier 15 rotatably supporting the planet gears 14. Gear teeth provided on the outer periphery of the carrier 15 threadably engage a rear gear 16 integrally with the rear screw shaft 7.

A single recess 13a is formed at a given position on the inner tooth gear 13 so as to be faced with a projection 17a of a lock member 17. The lock member 17 is connected to an electromagnetic plunger 18. A carrier lock 17b slightly projecting towards the rear side of the carrier 15 is formed on the front end of the lock member 17. The lock member 17 is urged in a direction shown by arrow a by a spring 19 during a normal condition when the electromagnetic plunger 18 is deenergized to allow the projection 17a to engage the recess 13a so as to prevent rotation of the inner tooth gear 13. Under this condition, the carrier lock 17b is separated from the carrier 15, so that the carrier 15 is not prevented from turning. When the electromagnetic plunger 18 is energized, the lock member 17 moves against the spring 19 in a direction shown by arrow b, so that the projection 17a is displaced from the recess 13a to allow inner tooth gear 13 to be rotatable. Under this condition, the carrier lock 17b locks the teeth of the carrier 15 to prevent the carrier 15 from turning.

Figure 2:
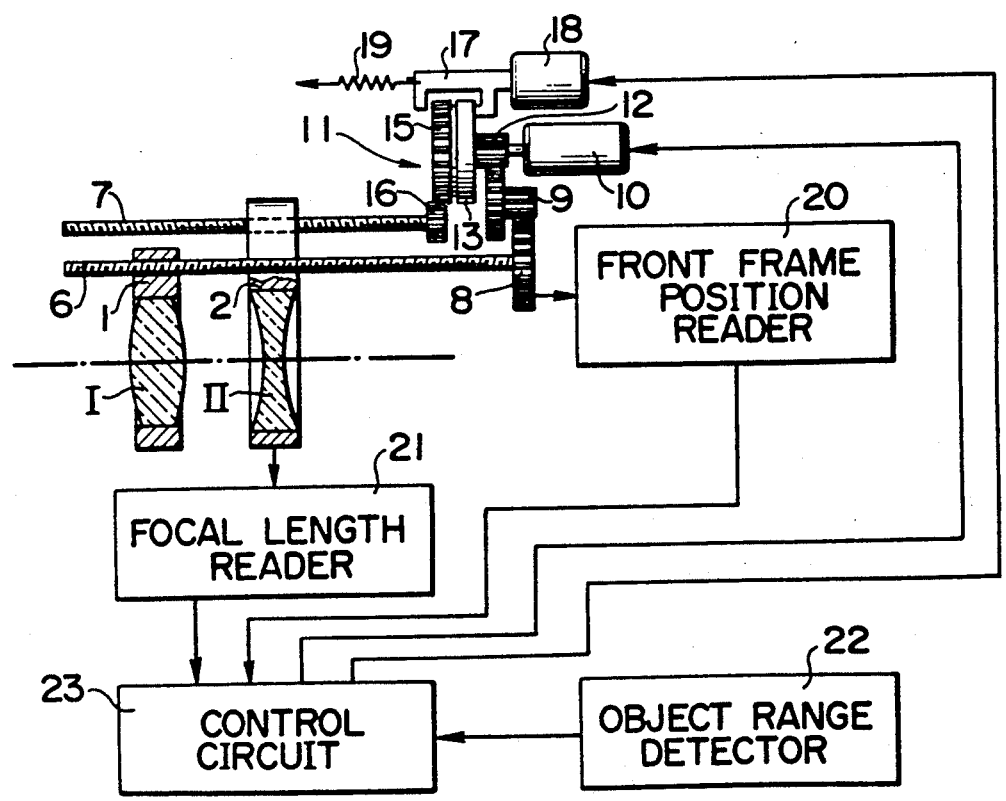
FIG. 2 is a schematic structure diagram of the two zoom lens groups shown in FIG. 1.

As shown in FIG. 2, a rotational amount of the gear 8 is read by a front frame position reader 20 and a position of the rear frame 2 is read by a focal length reader 21. A control circuit 23 controls the motor 10 and the electromagnetic plunger 18.

Further, a finder optical system 26 (FIG. 1) comprising lenses 24, 25 is provided in the vicinity of a photographing optical system comprising front and rear lens groups I, II. The finder optical system 26 also varies in its focal length in response to the zooming operation of the photographing optical system. The structure of the finder optical system 26 is omitted.

In operation, when a zooming signal is given by a zooming switch (not shown), control circuit 23 drives the motor 10. The electromagnetic plunger 18 is initially in a non-conductive condition and the lock member 17 is urged in the direction a, so that, as described above, the inner tooth gear 13 is locked by the lock member 17 and the carrier 15 is rotatable. Accordingly, when the sun gear 12 is turned with the motor driven, the planet gears 14 move around the sun gear 12 to rotate the carrier 15. The rotation of the carrier 15 is transmitted through the rear gear 16 to the rear screw shaft 7. In addition, the rotation of the sun gear 12 is transmitted through gear 9 and front gear 8 to the front screw shaft 6. Namely, at this time, front and rear screw shafts 6 and 7 are rotated simultaneously by the differential gear mechanism 11. The front frame 1 (front lens group I) and the rear frame 2 (rear lens group II) move with respectively different speeds from the wide-angle position (wide: W) to the tele position (tele: T) in a linear manner as shown in FIG. 3B.

Figure 3A:
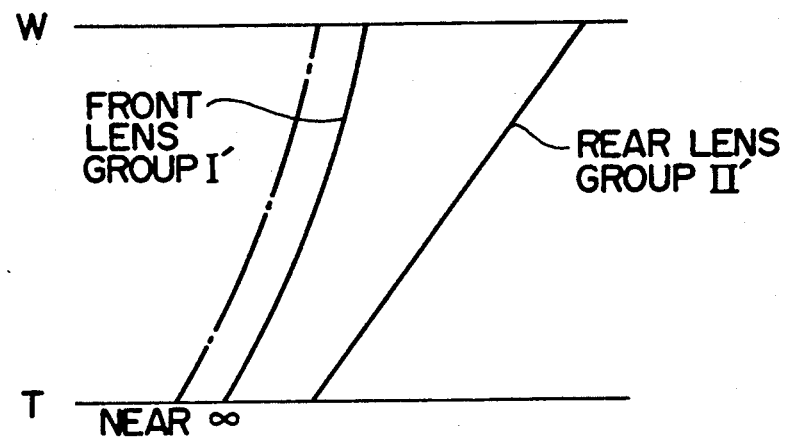
FIGS. 3A and 3B are diagrams illustrating movement of lens groups in an example of conventional two zoom lens groups and in the two zoom lens groups shown in FIG. 1, respectively.
Figure 3B:
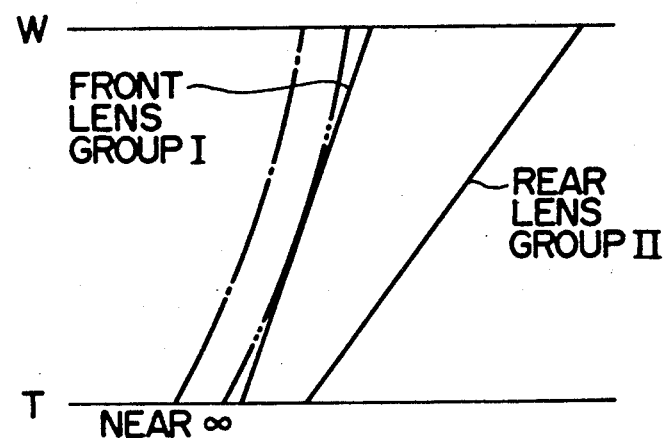

In this connection, in the case of conventional two zoom lens groups, as shown in FIG. 3A, assuming that a rear lens group II' moves from wide to tele in a linear manner with a single drive source, a front lens group I' is controlled in a non-linear manner with a different drive source from the above source. In general, a conventional arrangement is such that any one of two lens groups is moved in a non-linear manner to perform the zooming operation, because, as being widely employed in a single-lens reflex camera, this is not to allow the focus point to vary by the zooming operation. Accordingly, in the embodiment described above, in which the rear lens group II moves in a linear manner and the front lens group I should be essentially driven in a non-linear manner, the present invention is applied to a camera in which the focusing operation is performed immediately before the exposure after the zooming operation has been performed. As such, the zooming operation is performed by moving the front lens group I simultaneously with the rear lens group II in a linear manner.

When a release signal is given upon the completion of the zooming operation, the control circuit 23 energizes the electromagnetic plunger 18. Then, the lock member 17 moves in the direction b to lock the carrier 15 and to allow the inner tooth gear 13 to be rotatable. When the motor 10 rotates under this condition, only the front frame 1 moves for focusing while rotation of the rear frame 2 is suspended. At this time, the motor 10 is controlled by an output of the control circuit 23 based on outputs from a front frame position reader 20, focal length reader 21 and object range detector 22 to control movement of the front frame 1. Namely, a difference in a non-linear movement during the zooming operation is corrected by movement of the front lens group I during the focusing operation. When the front frame 1 moves to a given position, the motor 10 stops. Under this condition, the front lens group I assumes the condition that an object being photographed is focused at a given focal length between the point at infinity ($\infty$) shown with a two-dot chain line and the point at close range shown with a one-dot chain line, in FIG. 3B.

In comparison with the prior art, in a conventional two zoom lens shown in FIG. 3A, when the focusing operation is performed after the zooming operation, the front lens group I' moves between the point at infinity ($\infty$) shown with a solid line and the point at close range shown with a one-dot chain line for the focusing operation with a motor for use exclusively with the front lens group as an independent drive source.

An exposure operation is followed by the focusing operation. Upon completion of the exposure, the motor 10 is reversed by an output from the control circuit 23 and the electromagnetic plunger 18 is deenergized. The front frame 1 moves in the reverse direction by the reversal of the motor 10. When the front frame 1 returns to the position occupied before the focusing operation, the projection 17a of the lock member 17 engages the recess 13a of the inner tooth gear 13 to prevent the inner tooth gear 13 from rotating by the lock member 17 and to allow the carrier 15 to be rotatable. As a result, thereafter, front and rear frames 1 and 2 are made movable in a linear manner, thus enabling the zooming operation. If a rotational angle of the inner tooth gear 13 required for the focusing operation of the front frame 1 from $\infty$ to the point at close range is less than one revolution and the recess 13a of the inner tooth gear 13 is provided at one position, no problem would be caused in operation even when the electromagnetic plunger 18 is deactivated at the time the inner tooth gear 13 moves. When the front frame 1 has a large movement in the focusing operation and the inner tooth gear 13 rotates through a plural number of revolutions, it may be suitable, by providing a detector for detecting the number of revolutions of the inner tooth gear 13, to deenergize the electromagnetic plunger 18 when the remaining amount of reversing of the inner tooth gear 13 is within one revolution, while the front frame 1 is reversed and returns.

According to the first embodiment, since a mechanism for use exclusively in the focusing operation is omitted by sharing mechanisms for the focusing and zooming operations, it is possible to provide a zoom lens camera of a reduced size and cost. In addition, since accuracy is compensated by the mechanism, there is no need to utilize a highly accurate encoder and a complicated control.

While, in the prior art, a zooming mechanism is constituted by employing a cam member or the like, in the embodiment described above, a mechanism of a feed screw (front and rear screw shafts) connected to gears and a focusing mechanism are employed for the zooming operation, so that it is possible to reduce a cost.

Figure 5:
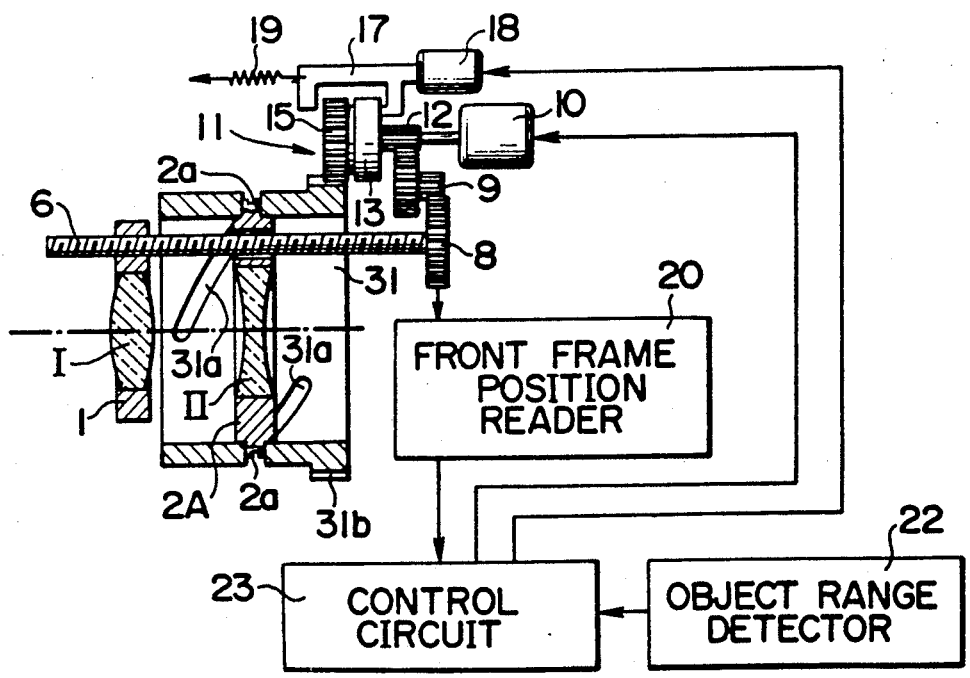
FIG. 5 is a schematic structure diagram of a zoom mechanism illustrating a second embodiment in which the present invention is applied to two zoom lens groups.

FIG. 5 illustrates a second embodiment of the present invention.

In the structure of the second embodiment, the arrangement of the front lens group I is the same as that of the first embodiment and the driving operation of the rear lens group II is different from that of the first embodiment. Specifically, a cam pin 2a on a rear frame 2A which holds the rear lens group II engages a cam groove 31a of a cam ring 31. A gear 31b is formed on the rear end of outer periphery of the cam ring 31 and mates with teeth of the carrier 15 of the differential gear mechanism 11.

Figure 6:
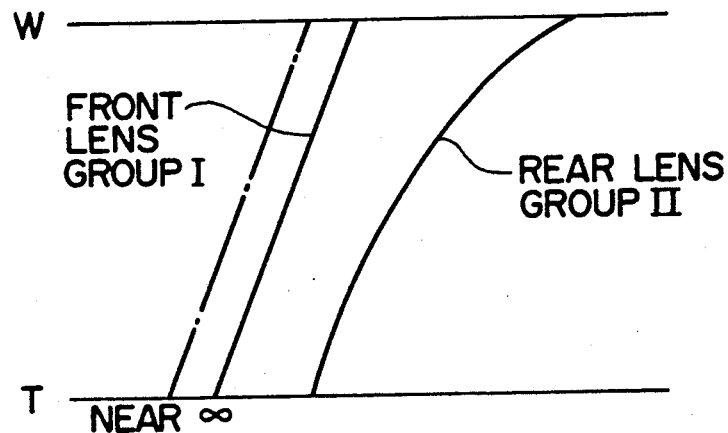
FIG. 6 is a diagram illustrating movement of each of the two zoom lens groups shown in FIG. 5.

Operation of the second embodiment is substantially the same as that of the first operation. A difference is that when the cam ring 31 rotates with a uniform speed by rotation of the carrier 15, the cam pin 2a of the rear frame 2A is guided by the cam groove 31a, so that the rear lens group II moves in a non-linear manner from wide to tele in a direction of the optical axis, as shown in FIG. 6. At this time, the front lens group I linearly moves in the same manner as the first embodiment. Thereafter, the front frame 1 moves alone to effect the focusing operation. In a zoom lens in which the rear lens group II moves in a non-linear manner, movement of the front lens group I is constant irrespective of the focal length, so that there is no need to utilize the focal length reader 21 (FIG. 2) employed in the first embodiment.

As such, the lens control in the second embodiment is made simpler than that of the first embodiment because of the use of the cam ring 31.

The first and second embodiments have the arrangement in which the inner tooth gear 13 is locked in rotation and is released from the locked condition by operation of the electromagnetic plunger 18. In place of the electromagnetic plunger 18, however, it may be possible to arrange this such that the inner tooth gear 13 is locked in rotation and is disconnected from the lock in cooperation with operation of a release button, for example. An example of such an arrangement will be described hereinafter with reference to FIG. 7.

Figure 7:
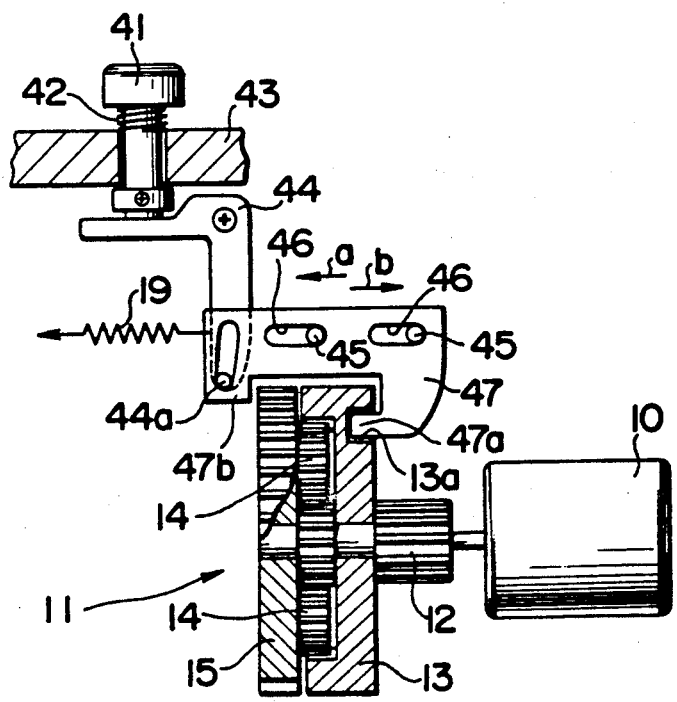
FIG. 7 is a structure diagram illustrating another example of a change-over device for switching the differential gear mechanism in the zoom mechanism of the first and second embodiments illustrated above.

In FIG. 7, a release button 41 is mounted through a release spring 42 in a coiled form on a camera body 43 in a vertically movable manner. The lower end of the release button 41 abuts against one arm of a connecting lever 44 within the camera body 43. The other arm of the lever 44 is connected through a pin 44a to a lock member 47. The lock member 47 is provided with a an elongated slot 46 which is guided by a stationary guide pin 45. The lock member 47, during a normal condition when the release button 41 is not depressed, is urged by a spring 19 in a direction shown with an arrow a, in a manner similar to the lock member 17 described above. A projection 47a of the lock member 47 engages a recess 13a of an inner tooth gear 13 to lock rotation thereof. At this time, a carrier lock 47b is evacuated from teeth of the carrier 15. Accordingly, during the zooming operation without depressing the release button 41, a sun gear 12 and the carrier 15 rotate to move front and rear frames 1 and 2 in a direction of the optical axis. When the release button 41 is depressed after the zooming operation, the connecting lever 44 rotates counterclockwise in FIG. 7. As a result, the lock member 47 moves in a direction shown with an arrow b to allow the projection 47a to leave the recess 13a and to lock the carrier 15 by the carrier lock 47b. Consequently, under this condition, the rear frame 2 (or 2A) stops and only the front frame 1 moves in a direction of the optical axis for the focusing operation by rotation of the carrier 15. Thereafter, the exposure operation is effected. When the motor 10 is reversed upon return of the release button 41 to its original position, the lock member 47 moves in a direction shown by arrow a by the spring 19 upon return of the inner tooth gear 13 to a position before the focusing operation to lock the gear 13 again, allowing the carrier 15 to be rotatable.

As thus far described, with the arrangement omitting the electromagnetic plunger 18, it is possible to reduce the size and cost of a zoom lens and to simplify its control.

All the foregoing embodiments having two zoom lens groups make it possible to share a common drive source between the zooming and focusing operations and to interrupt the drive mechanism for the zooming operation during the focusing operation, resulting in reduction in size and cost and a highly accurate zoom mechanism without necessitating a complicated control.

It will be understood that in order to linearly move a focusing lens group during the zooming operation and to control it to the focus position after the zooming operation, respective drive sources for use exclusively in the zooming and focusing operations may be employed.

Now, an embodiment in which the drive source for a zoom mechanism having two zoom lens groups is not shared, will be described in the following.

Figure 8:
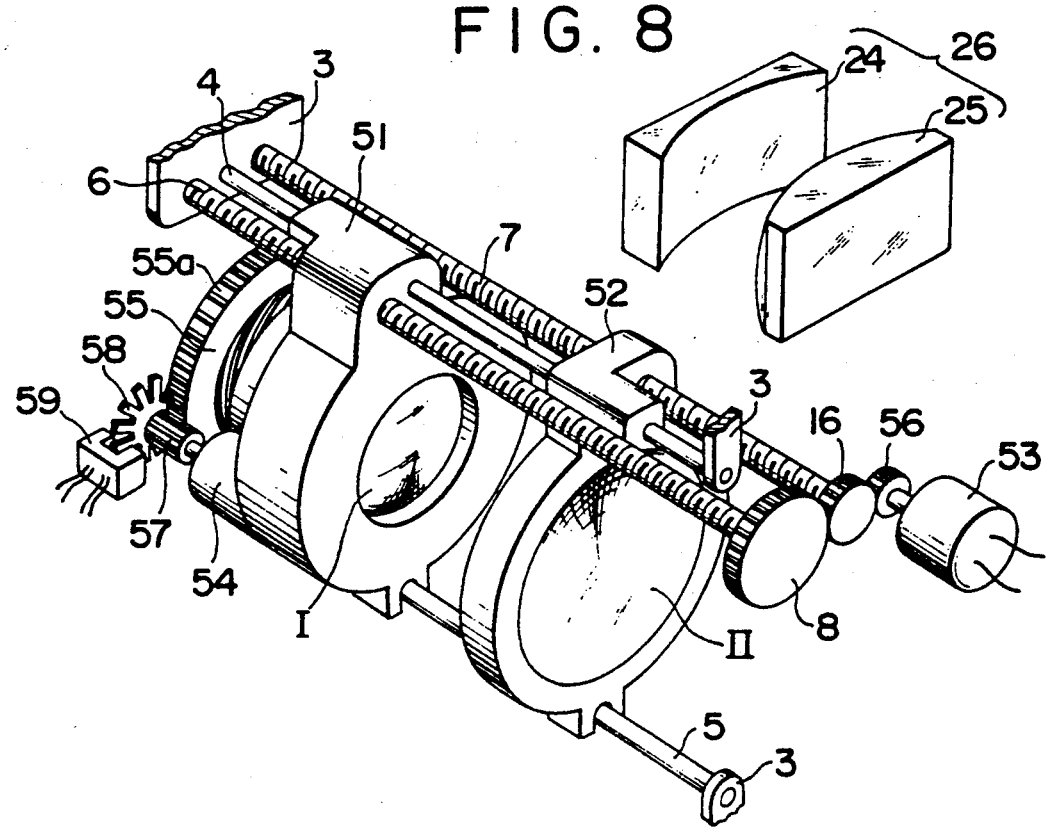
FIG. 8 is a perspective view of a zoom mechanism illustrating a third embodiment in which the present invention is applied to two zoom lens groups.
Figure 9:
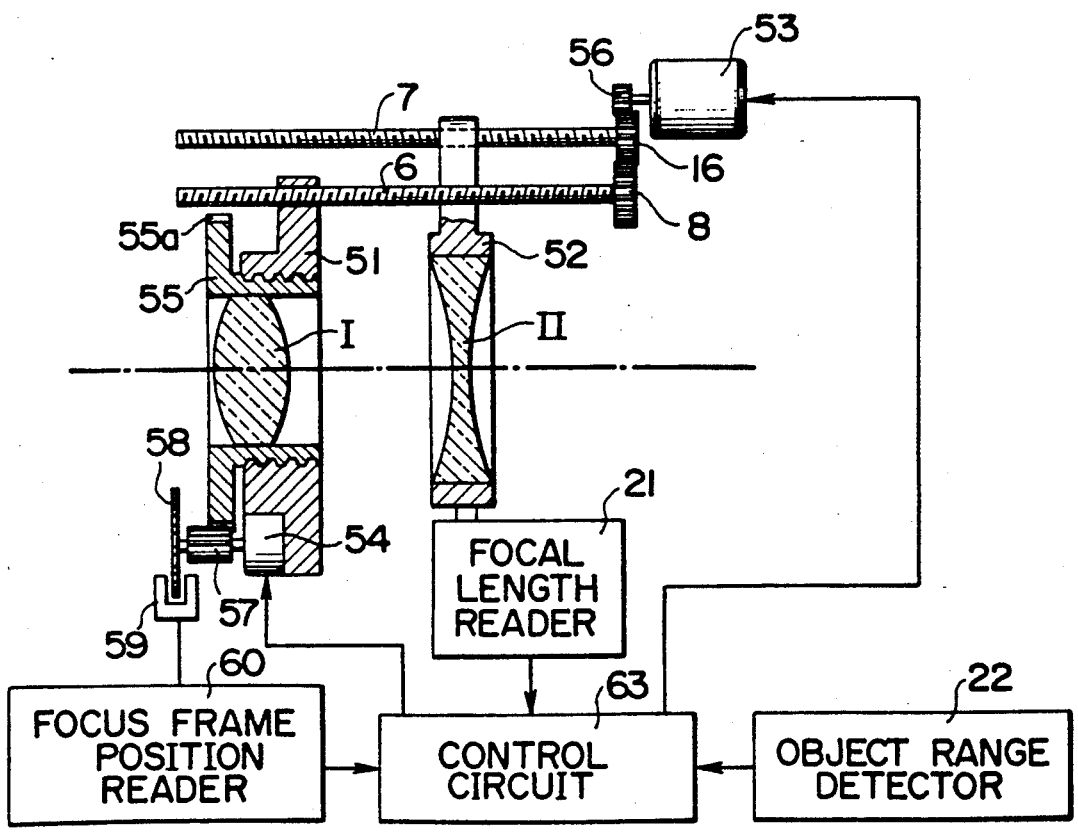
FIG. 9 is a schematic structure diagram of the two zoom lens groups shown in FIG. 8.

In FIGS. 8 and 9, a zoom mechanism having two zoom lens groups has an arrangement in which, like the embodiment shown in FIG. 1, a front frame 51 holding a front lens group I and a rear frame 52 holding a rear lens group II are carried respectively in a direction of the optical axis by a front screw shaft 6 and a rear screw shaft 7. The point of difference from the foregoing embodiment is that the zooming operation is effected by a zoom motor 53 and the focusing operation is effected by a focus motor 54. The front frame 51 threadably engages a focus frame 55 supporting the front lens group I which is a focusing lens group (FIG. 9). A front gear 8 integral with the front screw shaft 6 mates with a zoom gear 56 fixed to an output shaft of the zoom motor 53 through a rear gear 16 integral with the rear screw shaft 7.

Teeth 55a are formed on the end outer periphery in a flanged form of the focus frame 55 and mate with a focus gear 57 fixed to an output shaft of the focus motor 54. Accordingly, the focus frame 55 moves in a direction of the optical axis with rotation during rotation of the focus motor 54. A rotational amount of the focus motor 54, that is, movement of the focus frame 55, is converted to pulses by a pulse generator comprising a shading mask 58 fixed to the output shaft of the focus motor 54 and a photointerrupter 59.

Pulses produced in accordance with movement of the focus frame 55 are read by a focus frame position reader 60, as shown in FIG. 9. In addition, a position of the rear frame 52 is read by a focal length reader 21. A control circuit 63 controls the zoom motor 53 and the focus motor 54 on the basis of outputs from the readers 60 and 21 and object range detector 22.

In operation, when a zooming signal is given by a zooming switch (not shown), the control circuit 63 drives the zoom motor 53. When the zoom gear 56 rotates with the zoom motor 53 driven, front and rear screw shafts 6 and 7 rotate through the front and rear gears 8, 16. The front frame 51 (front lens group I) and the rear frame 52 (rear lens group II) linearly move from wide to tele, as shown in FIG. 3B.

When a release signal is given upon completion of the zooming operation, the control circuit 63 determines movement of the focus frame 55 on the basis of focal length information from the focal length reader 21 and photographing range information from the object range detector 22. Subsequently, the control circuit 63 drives the focus motor 54 to move the focus frame 55. When the focus frame 55 reaches a given position in accordance with information from the focus frame position reader 60, the focus frame 55 stops at the given position. Thereby, the front lens group I assumes an in-focus position to an object being photographed between the position at infinity ($\infty$) shown with a two-dot chain line and a close range position shown with a one-dot chain line in FIG. 3B. Thereafter, an exposure is effected by an exposure apparatus (not shown) to complete photographing.

In the embodiment just described above, two respective motors 53, 54 for use exclusively in the zooming and focusing operations are employed, so that there is no need to provide a connection change-over device comprising the differential gear mechanism 11 and the electromagnetic plunger 18, resulting in a structure having simple mechanism.

Figure 10:
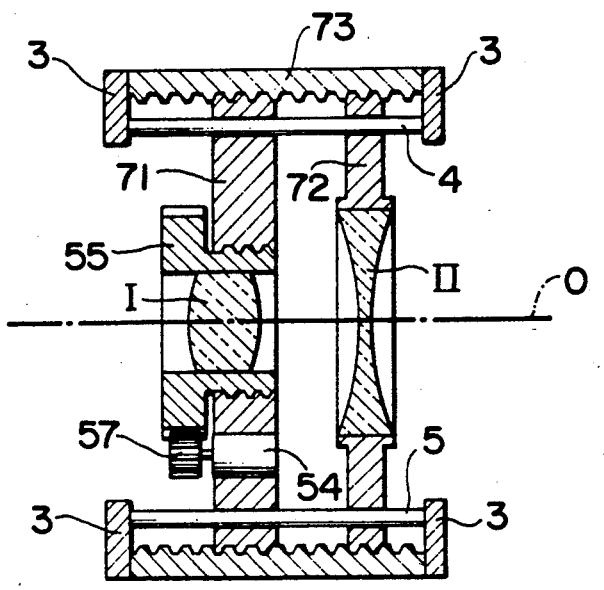
FIG. 10 is a schematic section view of a zoom mechanism illustrating a fourth embodiment in which the present invention is applied to two zoom lens groups.
Figure 11:
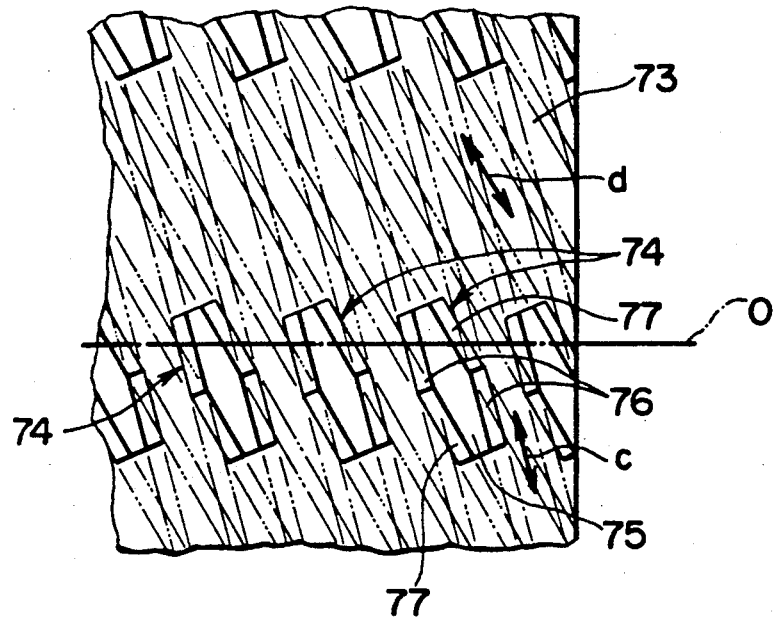
FIG. 11 is an expanded view of two kinds of helicoid formed on a multihelicoid shown in FIG. 10.

In another zoom mechanism having two zoom lens groups shown in FIG. 10, in place of front and rear screw shafts 6, 7 in the embodiment shown in FIGS. 8 and 9, a multihelicoid frame 73 is employed which is formed on the inner periphery by superposing helicoid screws of two kinds of pitches for respective uses in front and rear frames 71, 72. In FIG. 11, which is an expanded view of the inner periphery of the multihelicoid frame 73, the center part 75 in the hexagonal form of screw thread 74 is made a flat surface and a slant face 76 having a pitch along a direction shown with an arrow c and another slant face 77 having a pitch along a direction shown with an arrow d are formed so as to encircle the center part 75 and the directions c, d have different inclinations relative to the optical axis O. A number of screw threads 74 are arranged in line and one helicoid screw is formed by the slant plane 76 and another helicoid screw is formed by the slant plane 77. The multihelicoid frame 73 is rotatable with a zoom motor or manually. Thereby, the front frame 71 is carried by the helicoid screw formed by the slant plane 76 along the optical axis and the rear frame 72 is carried by the other helicoid screw formed by the slant plane 77. In addition, like the above embodiment, the front frame 71 is threadably engaged with the focus frame 55 holding the front lens group I. The rear frame 7 holds the rear lens group II. Other structures are the same as the foregoing embodiments.

In the present embodiment, when the multihelicoid frame 73 is rotated during the zooming operation, front and rear frames 71 and 72 linearly move in a direction of the optical axis in accordance with their leads of the helicoid screws, as shown in FIG. 3B. Other operations are the same as those of the embodiment shown in FIG. 9. In the embodiment, it is possible to reduce the number of parts and a cost more than those of the foregoing embodiment employing front and rear screw shafts.

It is to be noted that the present invention is applicable to not only two zoom lens groups but also three zoom lens groups.

Figure 12:
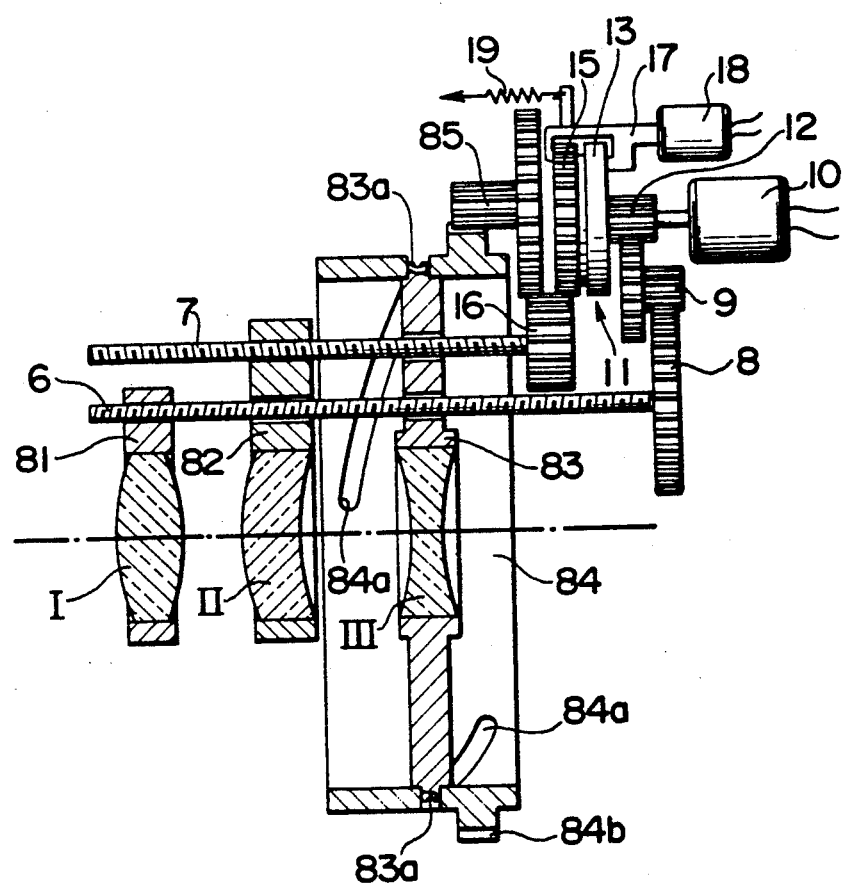
FIG. 12 is a schematic structure diagram of a zoom mechanism illustrating an embodiment in which the present invention is applied to three zoom lens groups.

FIG. 12 illustrates an embodiment in which the present invention is applied to three zoom lens groups. A first frame 81 holding a first lens group I which is a focusing lens group and a second frame 82 holding a second lens group II are movable in a direction of the optical axis by respective front and rear screw shafts 6 and 7, like the first embodiment. A third frame 83 holding a third lens group III has a cam pin 83a, like the second embodiment, which is fitted into a cam groove 84a of a cam ring 84. A gear 84b formed on the outer periphery of the cam ring 84 mates with a gear 85. The gear 85 mates with a carrier 15 of the same differential gear mechanism 11 as that used in the first and second embodiments, through a rear gear 16. First, second and third frames 81, 82 and 83 are supported by a support member (not shown) in a movable manner in a direction of the optical axis. Other structures are the same as those in the second embodiment.

In the present embodiment, like the first and second embodiments, since a sun gear 12 and a carrier 15 of the differential gear mechanism 11 are first rotated, front and rear screw shafts 6 and 7 rotate to move first and second frames 81 and 82 in a direction of the optical axis. At this time, a gear 85 mating through a rear gear 16 with the carrier 15 also rotates to rotate a cam ring 84 and thereby the third frame 83 moves also in a direction of the optical axis. A motor 10 rotates in a constant speed and first and second frames 81, 82 (first lens group I, second lens group II) move from wide to tele, as shown in FIG. 13B. However, since the third frame 83 (third lens group III) turns along the cam groove 84a, it moves non-linearly in a direction of the optical axis. After the zooming operation, like the first embodiment, only the first lens group I which is a focusing lens group moves in a direction of the optical axis on the basis of its own position information, focal length information and photographing range information and is focused between the position at infinity ($\infty$) shown with a two-dot chain line and a close range position shown with a one-dot chain line in FIG. 13B.

Even with three zoom lens groups, like the third embodiment (FIGS. 8 and 9) and the fourth embodiment (FIG. 10), it may be possible to provide a focusing motor for the exclusive use in the focusing operation after the zooming operation.

Figure 13A:
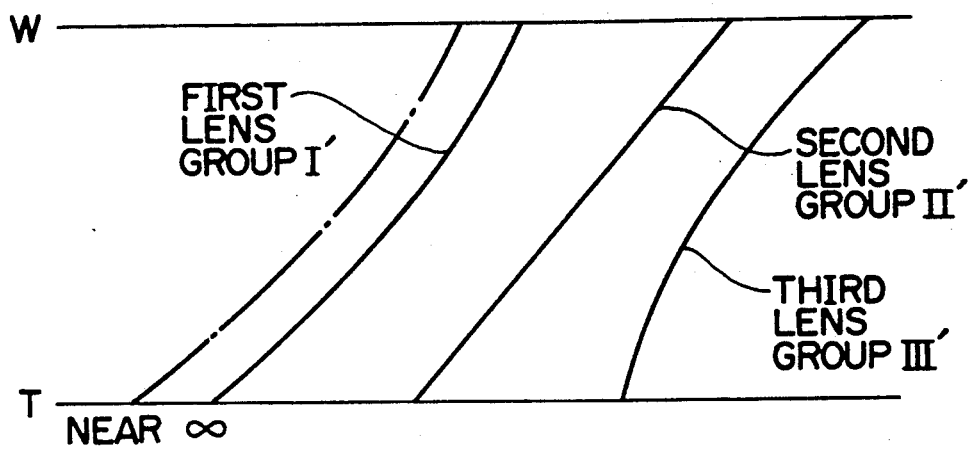
FIGS. 13A and 13B are diagrams illustrating movement of lens groups in an example of conventional three zoom lens groups and in the three zoom lens groups shown in FIG. 12.
Figure 13B:
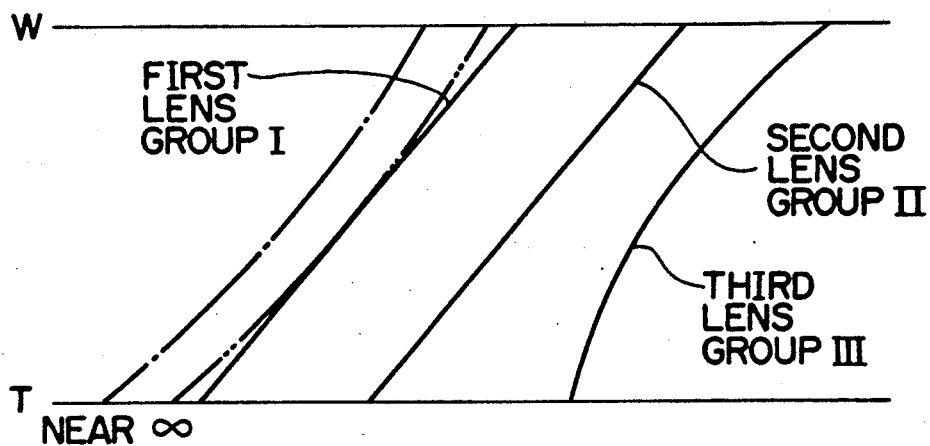

In a conventional arrangement of three zoom lens groups, as shown in FIG. 13A, only the second lens group II' moves in a linear manner. First and third lens groups I' and III' move in a non-linear manner in the zooming operation and thereafter the focusing operation is performed with the first lens group I'. While in such conventional arrangement, two of three lens groups move in a non-linear manner, in the present embodiment, it is possible to move a focusing lens group in a linear manner, resulting in reduction of the number of cam grooves and hence a reduction in cost. In addition, a release time lag is reduced.

It is to be noted that the present invention is applicable to zoom lens groups more than three groups.

A latitude of modification, change and substitution is intended in the foregoing disclosure, and in some instance, some features of the invention will be employed without a corresponding use of other features. Accordingly, it is appropriate that the appended claims be construed broadly and in a manner consistent with the spirit and scope of the invention herein.

What is claimed is:

1. A zoom mechanism for zoom lenses which performs a zooming operation by moving a plurality of lens groups including a focusing lens group in a direction of an optical axis, comprising:
    a drive source;
    a first drive mechanism for linearly driving said focusing lens group by said drive source in the optical axis direction;
    a second drive mechanism for linearly driving at least one of said plurality of lens groups other than said focusing lens group in the optical axis direction; and
    connection change-over means for connecting said first and second drive mechanisms to said drive source during the zooming operation and for disconnecting said second drive mechanism from said drive source during the focusing operation.

2. A zoom mechanism for zoom lenses according to claim 1, in which said first drive mechanism includes a screw shaft disposed in the optical axis direction and threadably engaging said focusing lens group such that said focusing lens group is carried in the optical axis direction by rotation of said screw shaft.

3. A zoom mechanism for zoom lenses according to claim 1, in which said second drive mechanism includes a screw shaft disposed in the optical axis direction and threadably engaging said at least one of said plurality of lens groups other than said focusing lens group such that said at least one of said plurality of the lens groups other than said focusing lens group is carried in the optical axis direction by rotation of said screw shaft.

4. A zoom mechanism for zoom lenses according to claim 1, in which said connection change-over means comprises a differential gear mechanism having first and second output gears and lock means for locking either one of said outputs of said differential gear mechanism, a gear of said differential gear mechanism to which gear a drive force from said drive source is normally transmitted being connected to said first drive mechanism and to one of said first and second output gears of said differential gear mechanism, said one of said first and second output gears being suspended in rotation with operation of said lock means and being connected to said second drive mechanism.

5. A zoom mechanism for zoom lenses according to claim 1, in which said connection change-over means comprises a differential gear mechanism having first and second output gears and an electro-magnetic plunger means having a locking member movable between a first and a second position, a gear of said differential gear mechanism to which gear a drive force from said drive source is normally transmitted being connected to said first drive mechanism and to one of said first and second output gears of said differential gear mechanism when said locking member is in its first position and which is suspended in rotation with operation of said locking member to said second position wherein said drive source is connected to said second drive mechanism.

6. A zoom mechanism for zoom lenses according to claim 1, in which said connection change-over means comprises a differential gear mechanism having first and second output gears and a release button cooperation mechanism movable between a normal and a release position, a gear of said differential gear mechanism to which gear a drive force from said drive source is normally transmitted being connected to said first drive mechanism and to one of said first and second output gears of said differential gear mechanism, said one of said first and second output gears being suspended in rotation with an operational aspect in response to a release operation of said release button cooperation mechanism, said release button cooperation mechanism being moved to the release position and thereby said drive source is connected to said second drive mechanism.

7. A zoom mechanism for zoom lenses according to claim 1, further including focusing lens group position reader means for reading a position of said focusing lens group, focal length detector means for detecting variation in focal length by a zooming operation of said at least one of said plurality of lens groups other than said focusing lens group, and object range detector means for detecting a range of an object being photographed, the focusing operation being performed, after the zooming operation, by a control signal based on outputs from said reader means, focal length detector means and object range detector means.

8. A zoom mechanism for zoom lenses which performs a zooming operation by moving a plurality of lens groups including a focusing lens group in a direction of an optical axis, comprising:
    a zoom drive mechanism for driving said focusing lens group and at least one lens group of said plurality of lens groups other than said focusing lens group in a linear manner for zooming;
    focal length detector means for detecting variation in focal length during the zooming operation;
    object range detector means for detecting a range of an object being photographed; and
    a focusing lens group drive mechanism for effecting a focusing operation by moving said focusing lens group to a position corresponding to an object range at each focal length on the basis of detected values from said object range detector means and said focal length detector means.

9. A zoom mechanism for zoom lenses according to claim 8, in which said zoom drive mechanism comprises two screw shafts disposed in parallel with the direction of the optical axis and respectively threadedly engaging said focusing lens group and said at least one lens group other than said focusing lens group such that said focusing lens group and said at least one lens group other than said focusing lens group are carried respectively in the optical axis direction by rotation of said two screw shafts.

10. A zoom mechanism for zoom lenses according to claim 8, in which said zoom drive mechanism includes a helicoid frame threadedly engaging said focusing lens group and said at least one lens group other than said focusing lens group such that said focusing lens group and said at least one lens group other than said focusing lens group are carried in the optical axis direction by rotation of said helicoid frame.

11. A zoom mechanism for zoom lenses according to claim 8, in which said zoom drive mechanism includes a multi-helicoid frame formed by superposing helicoids of two kinds of leads and threadedly engaging said focusing lens group and said at least one lens group other than said focusing lens group respectively such that said focusing lens group and said at least one lens group other than said focusing lens group are carried in the optical axis direction by rotation of said multihelicoid frame.

12. A zoom mechanism for zoom lenses according to claim 8, in which said zoom drive mechanism and said focusing lens group drive mechanism comprise two screw shafts disposed in parallel with the direction of the optical axis and respectively threadedly engaging said focusing lens group and said at least one lens group other than said focusing lens group, a common drive source and connection change-over means for connecting said drive source of said two screw shafts during the zooming operation and for disconnecting one screw shaft which threadedly engages said at least one lens group other than said focusing lens group from said drive source during the focusing operation.

13. A zoom mechanism for zoom lenses according to claim 12, in which said connection change-over means comprises a differential gear mechanism having first and second output gears and a lock means for locking either one of said first and second output gears of said differential gear mechanism, a gear of said differential gear mechanism to which gear a drive force from said drive source is normally transmitted being connected to the other screw shaft which threadedly engages said focusing lens group and one of said first and second output gears of said differential gear mechanism, said one of said first and second output gears being suspended in rotation by operation of said lock means and being connected to said one screw shaft which threadedly engages said at least one lens group other than said focusing lens group.

14. A lens drive mechanism for zoom lenses which performs a zooming operation by moving a plurality of lens groups including a focusing lens group in a direction of an optical axis, comprising;
first drive means for driving said focusing lens group and at least one lens group of said plurality of lens groups other than said focusing lens groups in a linear manner during the zooming operation; and
second drive means including means for automatically driving only said focusing lens group after the zooming operation for focusing.

15. The lens drive mechanism for zoom lenses according to claim 14, wherein said focusing lens group comprises first and second interconnected supports for enabling movement of the focusing lens group along the optical axis from either of said first and second drive means.

16. A lens drive mechanism for zoom lenses according to claim 15, wherein said second support is movably mounted within said first support.

17. A lens drive mechanism for zoom lenses according to claim 16, wherein said second support threadably engages said first support.

18. A lens drive mechanism for zoom lenses according to claim 16, wherein said first drive means includes a screw shaft threadedly engaging said first support and wherein said second drive means includes gear means engaging a periphery gear integral with said second support.

19. A lens drive mechanism for zoom lenses according to claim 16, wherein said first drive means includes a helicoid gear which threadedly engages the first support and wherein said second drive means includes gear means engaging a periphery gear integral with said second support.

20. A method of driving zoom lenses which perform a zooming operation by moving a plurality of lens groups including a focusing lens group in a direction of an optical axis, comprising:
initially simultaneously driving the focusing lens group and at least one lens group of said plurality of lens groups other than the focusing lens group in a linear manner during the zooming operation;
calculating an amount of driving the focusing lens group from object range information, focal length information and focusing lens group position information which are obtained by a release operation; and
driving only the focusing lens group on the basis of the calculated result for focusing.

21. A lens drive mechanism for a zoom lens which performs a zooming operation by moving a plurality of lens groups including a focusing lens group and at least one other lens group in a direction of an optical axis, comprising:
a single motor means;
coupling means having a first state for simultaneously coupling said motor means to said focusing lens group and said at least one other lens group during the zooming operation to simultaneously move both of said lens groups by said motor means and having a second state for coupling said motor means only to said focusing lens group during a focusing operation to move only said focusing lens group by said motor means.

22. A lens drive mechanism for a zoom lens according to claim 21, further including a drive screw coupling one of the lens groups to the coupling means and cam means coupling the remaining one of the lens groups to the coupling means.

23. A lens drive mechanism for a zoom lens which performs a zooming operation by moving a plurality of lens groups including a focusing lens group and at least two other lens groups in a direction of an optical axis, comprising:
a single drive motor;
coupling means having a first state for coupling all three lens groups to the drive motor during the zooming operation for simultaneously driving all of the lens groups by said motor and having a second state for coupling only the focusing lens group to the drive motor during a focusing operation for driving only said focusing lens group by said motor.

24. A lens drive mechansim for a zoom lens according to claim 23, wherein said coupling means includes cam means for moving one of said lens groups other than said focusing lens group.

25. A lens drive mechanism for a zoom lens according to claim 24, wherein said focusing lens group and at least one of the other two lens groups are threadedly coupled to said coupling means by first and second drive screws.

26. A lens drive mechanism for a zoom lens according to claim 25, wherein said coupling means comprises a differential gear meachanism having a first output gear coupled to said focusing lens group and to one of the other two lens groups and the second output gear coupled to at least one of the said other two lens groups.

27. A lens drive mechanism for a zoom lens which performs a zooming operation by moving a plurality of lens groups including a focusing lens group and at least two other lens groups in a direction of an optical axis, comprising:
a single drive motor;

coupling means having a first state for simultaneously coupling said drive motor to said focusing lens group and to at least one of the remaining lens groups during the zooming operation for simultaneously moving said focusing lens group and said one of the remaining lens groups by said motor and having a second state for coupling said drive motor only to said focusing lens group during a focusing operation for moving only said focusing lens group by said motor.

28. An operating system for performing zooming and focusing operations by moving a plurality of lens groups including a focusing lens group in the direction of an optical axis, comprising:
   a first drive mechanism for driving said focusing lens group and at least one of said plurality of lens groups other than said focusing lens group at the same time and in a linear manner for zooming;
   a second drive mechanism for obtaining a focused condition by driving only said focusing lens group subsequent to the zooming operation;
   said first drive mechanism including a first motor; and
   said second drive mechanism including a second motor.

29. The operating system of claim 28 wherein said focusing lens group comprises:
   said frame driven by said first drive mechanism;
   a second frame movable relative to said first frame and supporting lenses of said focusing lens group; and
   said second motor being mounted on said first frame.

30. The operating system of claim 29 wherein said first and second frames are threadedly coupled to each other;
   said second frame being provided with a peripheral gear;
   a focus gear coupled to said second motor and engaging said peripheral gear for rotating said second frame whereby the threaded engagement betweenj said first and second frames moves said second frame along said optical axis relative to said first frame.

* * * * *

UNITED STATES PATENT AND TRADEMARK OFFICE
CERTIFICATE OF CORRECTION

PATENT NO. : 5,016,993
DATED : May 21, 1991
INVENTOR(S) : Hiroshi Akitake

It is certified that error appears in the above-identified patent and that said Letters Patent is hereby corrected as shown below:

Column 14, line 18, change "betweenj" to --between--

Signed and Sealed this

Twelfth Day of January, 1993

Attest:

DOUGLAS B. COMER

Attesting Officer

Acting Commissioner of Patents and Trademarks